Jan. 1, 1924                                    1,479,272
                    H. E. YOUNG
              DEVICE FOR WASHING SURFACES
          Original Filed Dec. 23, 1920    2 Sheets-Sheet 1
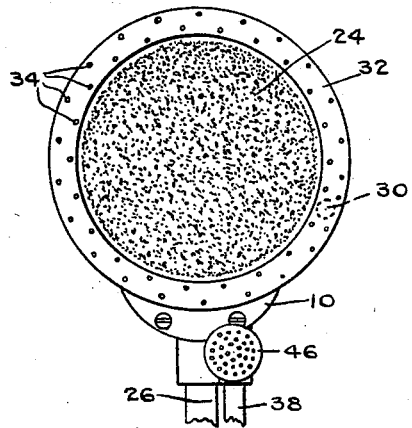
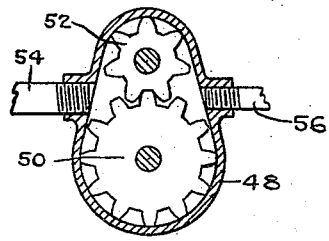
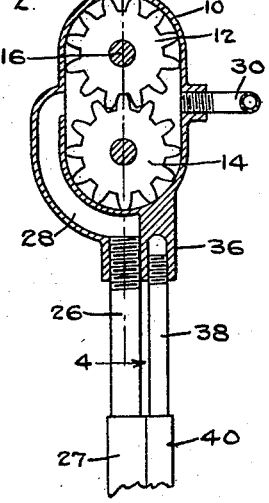
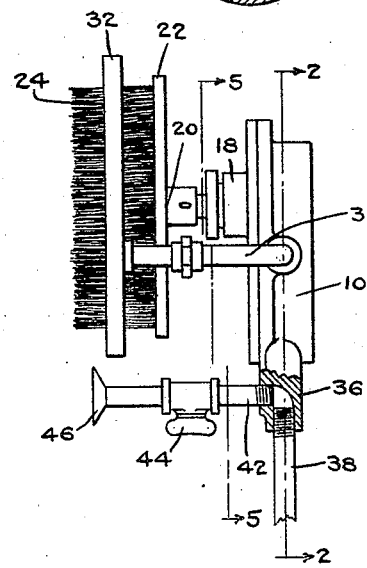
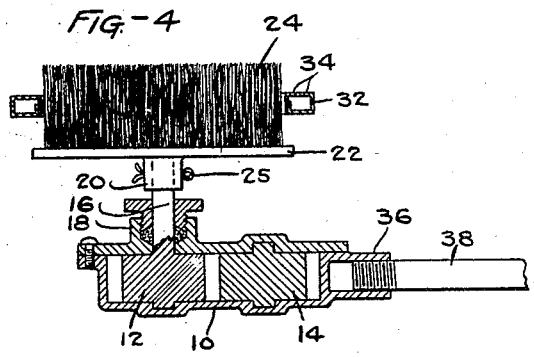
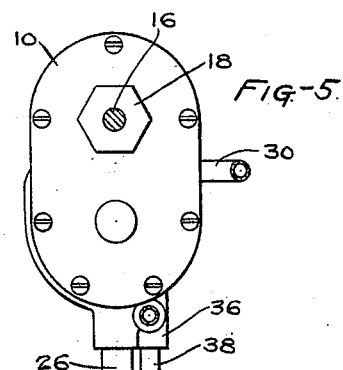
INVENTOR:
HAROLD E. YOUNG
BY Whiteley and Ruckman
ATTORNEYS.

Jan. 1, 1924 1,479,272
H. E. YOUNG
DEVICE FOR WASHING SURFACES
Original Filed Dec. 23, 1920 2 Sheets-Sheet 2
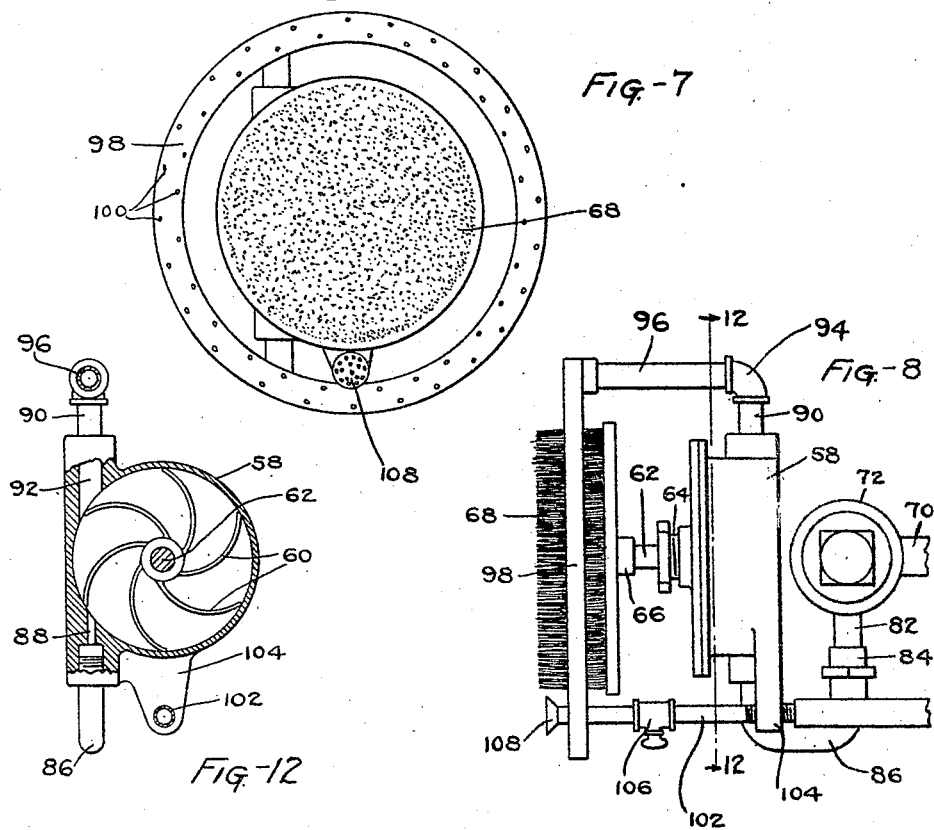
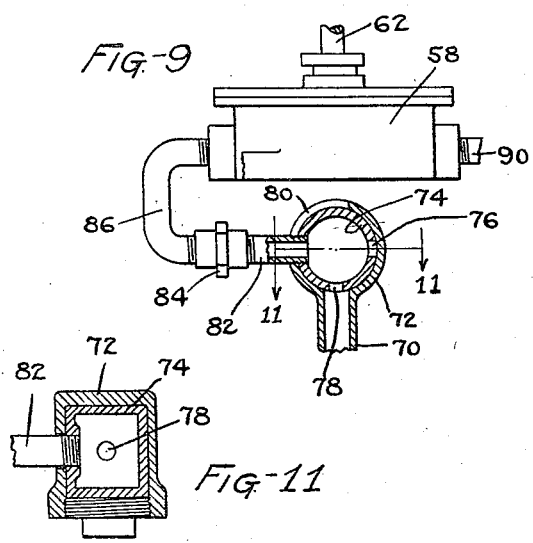
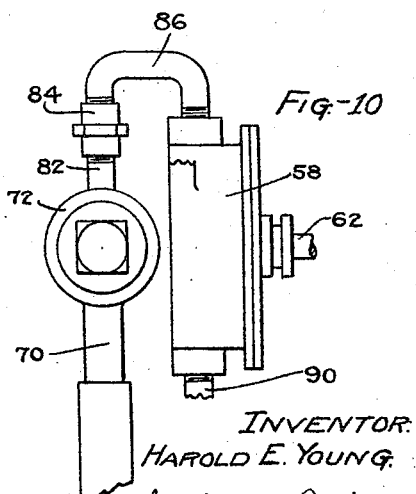
INVENTOR.
HAROLD E. YOUNG.
By Whiteley and Ruckman
ATTORNEYS.

Patented Jan. 1, 1924.

1,479,272

UNITED STATES PATENT OFFICE.

HAROLD E. YOUNG, OF MINNEAPOLIS, MINNESOTA.

DEVICE FOR WASHING SURFACES.

Application filed December 23, 1920, Serial No. 432,673. Renewed June 20, 1923.

*To all whom it may concern:*

Be it known that I, HAROLD E. YOUNG, a citizen of the United States, residing at Minneapolis, in the county of Hennepin and State of Minnesota, have invented certain new and useful Improvements in Devices for Washing Surfaces, of which the following is a specification.

My invention relates to devices for washing surfaces, and an object in particular is to provide a device for this purpose which may be operated in a semi-automatic manner for washing automobile bodies at the same time that the wheels of the automobile are being washed automatically, by means of an apparatus such as disclosed and claimed in my co-pending application Serial Number 381,659, filed May 15, 1920. In order to carry out this object, I provide a casing containing a water-motor which serves to rotate a brush while the water which passes through the motor is sprayed upon the surface to be washed in proximity to the rotating brush. In order to obtain a more thorough cleaning of the surface, a nozzle may be provided for delivering a spray of soapy water adjacent the spray produced by the water which has passed through the motor. It will be understood that my device may be used for washing other surfaces besides automobile bodies.

The full objects and advantages of my invention will appear in connection with the detailed description thereof, and the novel features embodied in my inventive idea will be particularly pointed out in the claim.

In the accompanying drawings;—

Fig. 1 is a top plan view of one form of my device. Fig. 2 is a view in section on the line 2—2 of Fig. 3. Fig. 3 is a view in side elevation. Fig. 4 is a view in section on the line 4—4 of Fig. 2. Fig. 5 is a view in section on the line 5—5 of Fig. 3. Fig. 6 is a view similar to Fig. 2 but showing a slight modification. Fig. 7 is a top plan view of a modified form of construction. Fig. 8 is a view in side elevation of this last form. Fig. 9 is a view showing the motor casing in side elevation and an adjustable pipe connection in central section. Fig. 10 is a view in side elevation showing the motor casing and the brush moved through 90° around the pipe connection. Fig. 11 is a view in section on the line 11—11 of Fig. 9. Fig. 12 is a view in section on the line 12—12 of Fig. 8.

Referring to the construction shown in Figs. 1 to 5 of the drawings, the numeral 10 designates a casing which contains two intermeshing gears 12 and 14 journaled therein with one of the journals indicated at 16 extending through a stuffing-box 18 to receive a socket 20 carried by the base plate 22 of a circular brush 24, the socket being secured to the shaft 16 in any suitable manner as by a cotter pin 25. An inlet pipe 26 for water leads into a passageway 28 discharging into the casing, this pipe being connected in any suitable manner, as by a hose 27, to a water-main. An outlet pipe 30 leads from the casing into a hollow ring 32 which surrounds the brush. The ring 32 is provided with perforations 34 for spraying the water around the brush after the water has passed the gears 12 and 14 which act as a motor to rotate the brush. The casing is provided with a hollow lug 36 into which leads a pipe 38 connected in suitable manner as by a hose 40 with a source of supply of soapy water. A pipe 42 controlled by a cock 44 leads from the lug 36 to a nozzle 46 for spraying the soapy water upon the surface to be cleaned. Fig. 6 shows a slight modification in which a casing 48 contains two intermeshing gears 50 and 52 of different sizes which constitute the motor. An inlet pipe 54 carries water into the casing for operating the gears, while an outlet pipe 56 carries the water from the casing. By attaching the brush to the shaft of either gear 50 or of the gear 52, it is evident that the speed of rotation of the brush may be varied.

Referring to the construction shown in Figs. 7 to 12, the numeral 58 designates a casing which contains a water motor having blades 60 secured to a shaft 62 which extends through a stuffing box 64 and receives the socket 66 of a circular brush 68. An inlet pipe 70 for water is provided with an enlarged cylindrical portion 72 within which is received a cylindrical member 74 having two openings 76 and 78 which are arranged 90° from each other around the circumference. The cylindrical portion 72 is provided with a slot 80 through which a pipe section 82 extends. This permits a rotative movement of the cylindrical member 74 so that either of the openings 76 and 78 may be brought into register with the inlet pipe 70. The pipe section 82 is connected by a union with a U-shaped pipe section 86 which in turn is connected with the motor casing so as to lead through a passageway 88 and discharge into the casing. A pipe section 90 leads from a discharge passageway 92 in the casing, and this pipe section is connected by an elbow 94 with a pipe section 96 which leads into a hollow ring 98 surrounding the brush 68. This ring is provided with perforations 100 for spraying the water around the brush after this water has passed through the motor. A pipe 102 extends through an opening in a lug 104 carried by the motor casing, and this pipe is provided with a cock 106 for controlling a supply of soapy water passing through the pipe and delivered to a nozzle 108 for spraying soapy water upon the surface to be cleaned.

The operation and advantages of my invention will be apparent from the foregoing description. When the supply of water is turned on so as to flow through the motor, the brush will be rotated and a spray of water will be delivered in proximity to the brush. The operator may use the pipes 26 and 38 as a handle to hold the flat outer face of the brush in contact with the surface to be washed. Whenever desired the cock 44 may be turned so that a spray of soapy water will be delivered from the nozzle 46 in proximity to the brush. By the use of my device surfaces such as automobile bodies may be efficiently and much more expeditiously washed than is possible by the present method of hand washing, since the proper amount of water and of soapy water, also, if desired, is constantly delivered in proximity to the brush and the operator may quickly move the brush over successive portions of the surfaces which are to be washed. Since the water is delivered in the form of a spray undesirable splashing is reduced to a minimum. The operation of the form of invention shown in Figs. 7 to 12 is similar to that already described, except that on account of the rotatable joint formed by the members 72 and 74, the brush may be adjusted so that its cleaning surface is either parallel with the inlet pipe 70 which serves as a handle or is at right angles thereto. The latter position, as will be apparent from Fig. 8, is desirable when the surface being cleaned is located directly ahead of the pipe 70. This capability of adjustment makes it much easier for the operator to clean surfaces thoroughly, as for instance in cleaning automobile bodies.

I claim:

A device for washing surfaces comprising a casing, a water motor in said casing, a brush supported from said casing and adapted to be rotated by said motor, a main pipe for conducting water into said casing to operate said motor, an adjustable connection for said pipe which permits said brush to assume different positions relatively to said pipe, and means for spraying the water which has passed through said casing directly upon the device to be washed in proximity to said brush.

In testimony whereof I hereunto affix my signature.

HAROLD E. YOUNG.